Patented Sept. 4, 1923.

1,467,096

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing. Application filed March 3, 1922. Serial No. 540,807.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for cellulose ethers and to compositions produced by the aid of such solvents. One object of the invention is to provide a solvent which will readily dissolve cellulose ethers and make as strong solutions as may be required in the varnish and plastic arts, including solutions sufficiently viscous for film manufacture. Another object of the invention is to provide cellulose ether compositions which may be made into strong flexible transparent film. Other objects will hereinafter appear.

I have discovered that these objects may be attained by mixing ethyl benzylaniline with certain alkyl compounds and by dissolving cellulose ether in the mixture. This mixture has a much greater solvent action than the sum of the solvent actions of its constituents when used alone. In fact ethyl benzylaniline alone has practically no solvent power for the ethers. The alkyl compounds which I may employ are the monohydroxy aliphatic alcohols containing less than six carbon atoms, acetates of such alcohols, and mixtures of these, and I designate these by the expression, a compound based upon a monohydroxy aliphatic alcohol containing less than 6 carbon atoms. In the preferred embodiments of my invention I prefer to use the more volatile of these compounds such as methyl alcohol, ethyl alcohol, methyl acetate, or ethyl acetate.

By way of example I may mix from 10 to 90 parts by weight of ethyl benzylaniline with 90 to 10 parts of methyl acetate. A 10 to 90 mixture of ethyl benzylaniline and methyl acetate, for instance, will dissolve from one-fourth to one-sixth (say one-fifth) of its own weight of water-insoluble ethyl cellulose to form a thick, viscous, flowable solution suitable for film manufacture in the usual way.

Other substances which impart useful properties to the film may be added to the flowable composition such, for example, as triphenyl or tricresyl phosphate, camphor, monochlornaphthalene, etc. The ingredients are of the commercial type, sufficiently purified to give film having the desired freedom from color. On account of its relatively higher boiling point ethyl benzylaniline evaporates more slowly and sufficient amounts of it remain in the film to increase the useful properties of the latter.

Having thus described my invention, what I claim as new and desire to secure by Letters Patent is:

1. A composition of matter comprising cellulose ether and ethyl benzylaniline.

2. A composition of matter, comprising cellulose ether dissolved in a mixture of benzylaniline and a liquid compound which coacts with said benzylaniline to give said mixture greater solvent action on the cellulose ether than the sum of the solvent actions of its said constituents used alone, said liquid compound being based upon a monohydroxy aliphatic alcohol containing less than 6 carbon atoms.

3. A composition of matter comprising cellulose ether, ethyl benzylaniline and methyl acetate.

4. A viscous, flowable, film-forming composition, comprising 1 part by weight of cellulose ether dissolved in from 4 to 6 parts of a mixture containing benzylaniline and a liquid compound which coacts with said benzylaniline to give said mixture greater solvent action on the cellulose ether than the sum of the solvent actions of its said constituents used alone, said liquid compound being based upon a monohydroxy aliphatic alcohol containing less than 6 carbon atoms.

5. A composition of matter comprising cellulose ether in a mixture of 10 to 90 parts of ethyl benzylaniline with 90 to 10 parts of methyl acetate.

6. As an article of manufacture a flowed film comprising cellulose ether and ethyl benzylaniline.

7. As an article of manufacture a flowed flexible film comprising water-insoluble ethyl cellulose and ethyl benzylaniline.

Signed at Rochester, New York, this 24th day of Feb., 1922.

STEWART J. CARROLL.